United States Patent [19]

Sezerman

[11] Patent Number: 4,889,406
[45] Date of Patent: Dec. 26, 1989

[54] TILT ADJUSTABLE OPTICAL FIBRE CONNECTORS

[76] Inventor: Omur M. Sezerman, P.O. Box 11218, Station H, Nepean, Ontario, Canada, K2H 7T9

[21] Appl. No.: 210,388

[22] Filed: Jun. 23, 1988

Related U.S. Application Data

[63] Continuation-in-part of Ser. No. 847,416, Apr. 3, 1986, Pat. No. 4,753,510.

[51] Int. Cl.$^4$ .............................................. G02B 6/38
[52] U.S. Cl. ............................ 350/96.21; 350/96.18; 350/96.20
[58] Field of Search ............... 350/96.18, 96.19, 96.20, 350/96.21, 96.22

[56] References Cited

U.S. PATENT DOCUMENTS

| | | | |
|---|---|---|---|
| 4,087,155 | 5/1978 | Deacon | 350/96.21 |
| 4,130,344 | 12/1978 | Lemonde | 350/96.21 |
| 4,142,777 | 3/1979 | Gauthier et al. | 350/96.21 |
| 4,265,511 | 5/1981 | Nicia et al. | 350/96.18 |
| 4,290,667 | 9/1981 | Chown | 350/96.18 |
| 4,296,999 | 10/1981 | Mead | 350/96.18 |
| 4,329,017 | 5/1982 | Kapany et al. | 350/96.15 |
| 4,362,360 | 12/1982 | Mannschke | 350/96.20 |
| 4,385,798 | 5/1983 | Yevick | 350/96.14 |
| 4,447,119 | 5/1984 | Beasley | 350/96.18 |
| 4,486,071 | 12/1984 | Levinson | 350/96.18 |
| 4,542,956 | 9/1985 | McCrickerd | 350/96.20 |
| 4,564,260 | 1/1986 | Dirmeyer et al. | 350/96.16 |
| 4,579,418 | 4/1986 | Parchet et al. | 350/96.20 |
| 4,641,915 | 2/1987 | Asakawa et al. | 350/96.18 |
| 4,723,830 | 2/1988 | Messbauer | 350/96.20 |
| 4,753,510 | 6/1988 | Sezerman | 350/96.21 |
| 4,753,511 | 6/1988 | Bowers et al. | 350/96.21 |

FOREIGN PATENT DOCUMENTS

| | | |
|---|---|---|
| 1155282 | 10/1983 | Canada . |
| 2012984 | 8/1979 | United Kingdom . |
| 2053784 | 2/1981 | United Kingdom . |
| 2062893 | 5/1981 | United Kingdom . |

OTHER PUBLICATIONS

Soref et al., "Tilting-Mirror Fiber-Optic Accelerometer", Feb. 1984, *Applied Optics*, vol. 23, No. 3, pp. 486-491.
"Multiposition Optical-Fibre Switch", *Electronic Letters*, vol. 15, Feb. 13, 1979, pp. 192-194, Tomlinson et al.
Newport Corporation, "Precision Fiber Couplers", *Newport Product Supplement*, pp. 65-66, 1985.
Joseph C. Palais, "Fiber Coupling Using Graded-Index Rod Lenses", *Applied Optics*, vol. 19, No. 12, pp. 2011-2018, Jun. 15, 1980.
W. J. Tomlinson, "Applications of GRIN-Rod Lenses in Optical Fiber Communication Systems", *Applied Optics*, vol. 19, No. 7, pp. 1127-1138, Apr. 1980.
Patent Abstracts of Japan, Apr. 6, 1983, vol. 7, No. 82, p. 189.
Patent Abstract of Japan, Feb. 5, 1983, vol. 7, No. 30, p. 173.

*Primary Examiner*—John D. Lee
*Attorney, Agent, or Firm*—Jones, Tullar & Cooper

[57] ABSTRACT

An adjustable connector for optically connecting one optical fibre to another fibre or a light source is disclosed. In one embodiment a base plate mounting the fibre is connected to another base plate with a resilient member between the base plates. The fibre terminates at a beam expanding or imaging lens. Sets of alternating first and second screws axially extend from one base plate to the other such that when a test signal is transmitted to the fibre the first screws can be adjusted to coarsely tilt one base plate relative to the other until approximately the desired signal strength is achieved. The second screws are then rotated to finely adjust the base plates to achieve the desired signal strength. In other embodiments adjusting screws extend radially with respect to a cylindrical housing holding the fibre so as to adjust the relative position thereof. Adjustment can also be achieved using a temporary jig which can be removed and reused. With the invention insertion and tilt losses at the connector are minimized.

14 Claims, 4 Drawing Sheets

TILT ADJUSTABLE OPTICAL FIBRE CONNECTORS

CROSS-REFERENCE TO RELATED APPLICATION

This is a continuation-in-part of my copending U.S. patent application Ser. No. 06/847,416 filed Apr. 3, 1986, now U.S. Pat. No. 4,753,510, issued June 28, 1988, the entire contents of which are incorporated herein by reference.

FIELD OF THE INVENTION

The present invention relates to connectors used to effect connections between separate lengths of optical fibres or between a light source and a receiver fibre. In particular the invention relates to connectors which are adjustable to optimize the transmission of light energy through the joint and which do not lose their adjustment if the joint is broken and then remade.

BACKGROUND OF THE INVENTION

The use of optical fibres for the transmission of data or optical information has increased dramatically in recent years. The heart of such transmission systems is an optical fibre of silica glass or other suitable material which has been clad with an appropriate material to achieve a "light tube" or waveguide along which light energy can travel in a controlled manner. Optical fibres are extremely small (maybe 100 microns in diameter) and when they are incorporated into a data transmission system it is necessary to effect interconnections between separate lengths of such fibres. The primary function of an optical connector is to provide a low-loss coupling of light energy from one fibre to the next and it is necessary to align, in an extremely precise manner, the cores of the coupled fibres so as to keep the losses at the joint to an absolute minimum.

The best coupling possible between two fibres is achieved by polishing the ends of the fibres to a smooth finish and then directly butting the ends together. Disregarding any Fresnel losses at the glass-air interface such a connection should have losses in the order of 0.2 dB. This type of connection requires high precision equipment and is best suited for permanent splices. For repeated connections a more rugged connector is required, but such can lead to increased losses.

There are six main sources of losses in any fibre to fibre coupling system. The greatest losses are due to lateral misalignment, when the mating fibres are not aligned along their central axes. Also, although manufacturers place tight tolerances on the position of the core within the cladding, any eccentricity of the central core is treated as a lateral misalignment condition. Angular losses occur when the central axes of the two fibres are tilted with respect to each other. End separation losses occur when the ends of the mating fibre are separated. Greater separations result in greater losses since light emanating from the end of an optical fibre is projected in the form of a cone. Dirt, surface irregularities and non-perpendicular ends conspire to keep the ends apart and generate losses. Extrinsic connector (intrinsic fibre) losses are caused by variations in the optical parameters of the fibre, including its "numerical aperture" (NA), concentricity of the core, core ellipticity and diameter variations. Finally, Fresnel losses occur whenever light passes from one transparent medium into another medium of a different index of refraction, since part of the transmitted light will be lost to a reflected beam. For transmission from glass to air the Fresnel losses can be 0.2 dB for each surface. This loss can be eliminated by using index-matching fluids, or reduced by using anti-reflection coatings.

In order to minimize losses such as described above the tolerances of butt-joint connections must be extremely tight. However, any small piece of dirt which enters the joint can drastically increase the losses of the connection and accordingly the ends of the fibre must always be protected from ambient conditions.

The problems associated with connections as described above can be reduced by the use of "expanded beam" technology through which the optical beam diameter is increased from the core diameter of 100 microns up to a more manageable size of a few millimeters. Since the resulting beam is considerably larger than a speck of dirt the losses associated therewith are reduced. Furthermore since one is dealing, relatively speaking, with a macro rather than a micro situation all aspects of the connection become simpler, from manufacture, to maintenance.

If a fibre is placed at the focal point of a lens then the beam emerging from the lens is collimated with diameter much larger than that of the fibre core and if each fibre has an appropriate lens the spot image from one will be formed on the other at the focal point of its lens. Expanded beam connectors obviously reduce losses due to lateral misalignment and end separation. However, due to the autocollimation such connectors increase the losses due to angular misalignment.

In principle, if the fibres are positioned at the focal point of the lenses with the same accuracy as with end-to-end butt joint connections the losses should be the same with an expanded beam coupler. Several couplers using expanded beam technology are presently available commercially. One of the easiest lenses to use in fibre connectors is the graded index (GRIN) lens.

Cylindrical GRIN lenses are functionally identical to conventional spherical lenses except that they have flat end surfaces. The change in the index of refraction along its axis generates the unique properties of the GRIN lens and lenses can be tailored by the manufacturer to generate a wide range of optical parameters. The length of a lens defines its pitch, or the fraction of a complete wavelength, that is contained within the lens at a particular wavelength. For the production of a collimated beam from a point source it is necessary to use a quarter-pitch lens.

If one quarter-pitch GRIN lens in a joint is tilted by an angle $\theta$ relative to the other lens then the transmitted image will be displaced relative to the receiving lens axis by an amount given by the equation $z = \tan \theta / N_o A$ where $\theta$ is the tilt angle; $N_o$ and $A$ are GRIN lens parameters which determine the focal length of the lens, since $f = 1/N_o A$. For different types of specific GRIN lenses the losses due to a tilt angle of 1 degree can range from about 6 dB to well over 10 dB. Furthermore, as the fibre core size decreases the tilt losses will become more severe. In a GRIN lens connector if there is any tilt variation in the lenses or even in the placement of the fibres then the transmitted image will not be focused on the receiving fibre. It therefore is very desirable to achieve a connector in which the tilt losses are minimized without demanding extremely high (costly) manufacturing tolerances.

The principles stated above apply to other imaging lenses, not just to GRIN lenses. If the image is formed at the focal point of the lens then a tilt through the angle $\theta$ will produce a translation of $$z = \frac{\tan \theta}{N_oA} = f \tan \theta \simeq f\theta$$

at the fibre end face. For small angles $\theta \simeq \tan \theta$.

The aforementioned U.S. patent application described and claimed several embodiments of tilt-adjustable fibre optic connectors which meet all of the requirements indicated above. Connectors for fibre-to-fibre joints and for source-to-fibre joints were disclosed therein, with the connectors using either axial tilt or radial tilt principles to achieve the desired ends.

SUMMARY OF THE INVENTION

The present invention is intended to overcome specifically the tilt problems associated with beam expanding or imaging lens type connectors or couplers and the extremely high tolerance requirements of placing the fibre end at the focal point of the lens. The present invention is embodied in a new connector or coupling device which is economical to manufacture, may be easily hermetically sealed in use, is effortlessly manipulated during disconnection and reconnection, and is adjustable to optimize the transmission of light energy therethrough. The coupling device of the present invention uses the properties of lenses in combination with novel tilting techniques to achieve a compact structure capable of submicron resolution. Furthermore, with very little, or even no, adjustment devices embodying the principles of the present invention could be used as source couplers, attenuators or connectors to couple light into any size or number of receiving fibre(s).

Throughout the disclosure and claims it should be understood that the word "optimum" and its variants is intended to have a broad meaning, such as "most favourable under defined conditions". The "optimum" signal strength for a coupler might be the maximum obtainable, whereas for an attenuator it would be a desired signal strength, less than maximum.

In one form the present invention utilizes a pair of base plates each having a threaded boss thereon and an axial bore therethrough. Each bore is adapted to receive in a predetermined position therein a holder which carries a beam expanding or imaging lens and an optical fibre associated therewith. The lens holder has a nut thereon for threaded connection to the boss of the base plate such that the holder can be disconnected from the base plate and reconnected thereto. A resilient member is sandwiched between confronting faces of the base plate and two sets of threaded screws interconnect the base plates by passing from one plate through the resilient member to the other plate. The central void area of the resilient member contains the opposing faces of the lenses and may be hermetically sealed from the surrounding atmosphere by sealing contact with the base plates. Once the connector has been assembled a test light can be transmitted from one fibre through the connection to the other fibre and then to a suitable receiver. The first set of threaded screws can then be adjusted to initially or coarsely alter the angular orientation of one base plate relative to the other so as to alter the angular orientation of one lens and its fibre relative to the other. During adjustment the receiver is monitored and the first screws are adjusted in a pattern until the detected output is approximately at the desired level at which point the second set of screws is adjusted to fine tune the adjustment until the detected output is optimized. The screws of the second set have a finer thread than those of the first set. Even if one or both of the fibres is disconnected from the joint as described above the base plates will hold their adjusted condition and the fibres can be reconnected to the joint without fear of any increase in losses after reconnection.

The foregoing represents an embodiment wherein axial adjustment of the screws achieves the desired end. The same end can be achieved using screws oriented radially with respect to a fibre and lens holder mountable in a housing. Also, the end can be achieved in radial-tilt connectors by utilizing reusable adjustment jigs which fit over the fibre and lens holder and over the housing so that the fibre and lens holder can be adjusted relative to the housing. Then the fibre and lens holder can be fixed relative to the housing, as by potting, and the jig removed. In such a structure the fibre and lens holder could not be removed from the housing without destroying the adjustment previously made.

Other aspects of the invention will become apparent from the description and claims which follow.

DESCRIPTION OF THE PREFERRED EMBODIMENT

Figure 1:
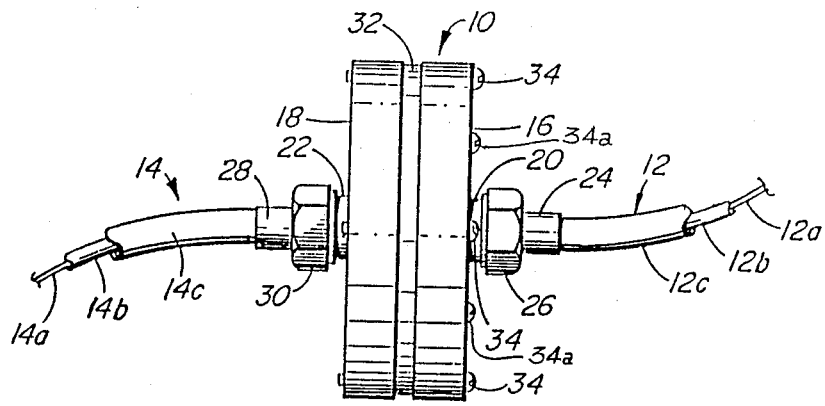
FIG. 1 is a side view of an optical fibre coupling device of the present invention.
Figure 3:
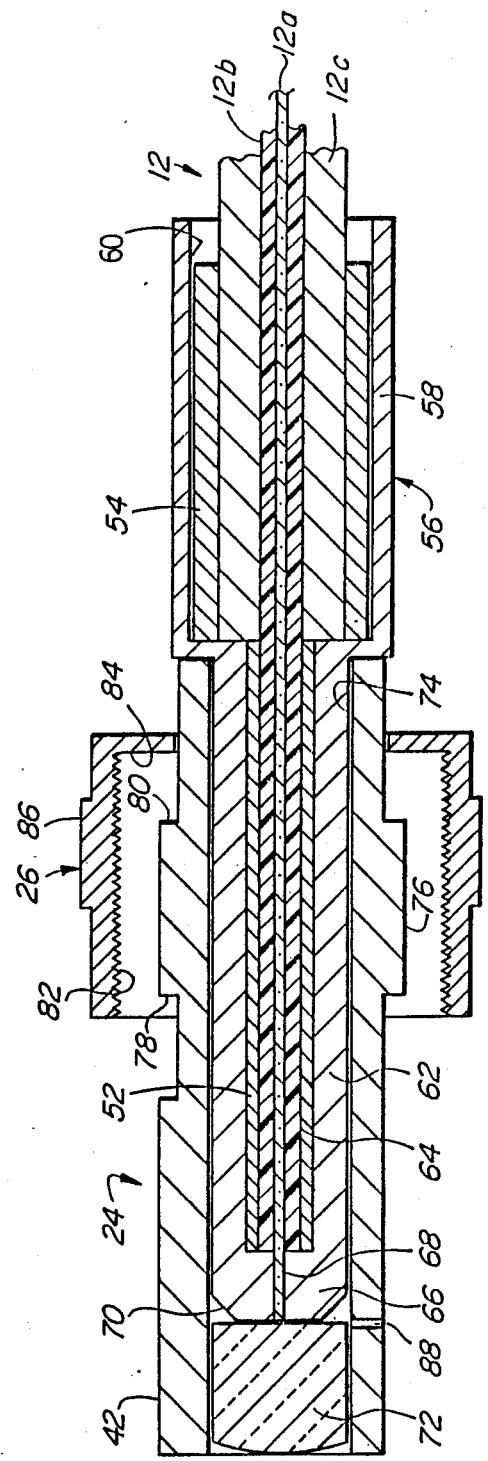
FIG. 3 is a cross-section of an optical fibre and lens holder receivable in a base plate of the FIG. 1 embodiment.

One embodiment of an optical fibre coupling device according to the present invention is illustrated in FIG. 1 under reference number 10. The coupling device 10 is used to join a pair of optical fibre assemblies 12, 14 in end-to-end relation so that an optical signal in the form of light energy can be transmitted from one assembly to the other with minimum losses at the joint. The optical fibre assemblies 12, 14 typically include the clad optical fibre core 12a, 14a, plastic coating 12b, 14b surrounding the core and a protective cable or sheath 12c, 14c surrounding the coating. With reference to FIG. 3 it is seen that each clad fibre core 12a, 14a terminates at a graded index lens (GRIN) 72, which with the fibre core end being positioned at the focal point of the lens, expands and collimates the optical signal for improved transmission to the receiving GRIN lens. Suitable GRIN lenses for the present invention are available under the SEL-FOC (Trademark) designation from the Nippon Sheet Glass Company.

Figure 2:
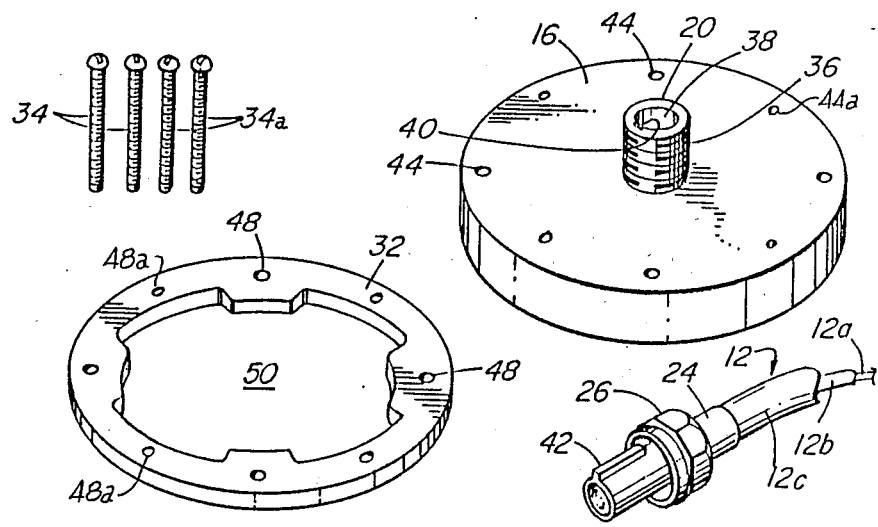
FIG. 2 is a composite view of the major components of the coupling device of FIG. 1.
Figure 2:
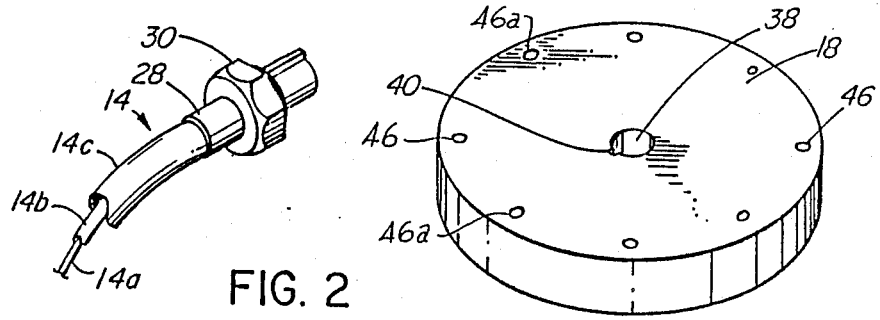

With reference to FIGS. 1 and 2 it will be seen that each optical fibre assembly 12, 14 is received in a corresponding base plate 16, 18 via an appropriate connection mechanism to be described herein. Each base plate, 16, 18 is provided with a central boss 20, 22 projecting outwardly from one face thereof. Each boss carries external threads 36 and a central bore 38 extends axially through the boss and its base plate to exit at the flat obverse face thereof. A keyway 40 is machined in the sidewall of the bore 38 for a purpose to be described.

Each fibre assembly 12, 14 carries at its end a lens holder 24, 28 and each lens holder in turn carries a nut 26, 30 which is free to rotate thereon. Furthermore each lens holder carries a key 42, which is matable with the keyway 40 provided in the axial bore 38 of each base plate. When it is desired to assemble a fibre assembly 12, 14 to its base plate 16, 18 it is only necessary to slide the lens holder 24, 28 into the appropriate axial bore 38 with the key 42 engaging the keyway 40 and to then rotate the nut 26, 30 to engage the internal threads thereof with the external threads 36 on the boss 20, 22. When the mating threads are fully engaged the lens holder will be held in a predetermined position within its base plate.

Returning to FIG. 2 it will be seen that one base plate 16 is provided with first and second sets of circumferentially spaced and alternating through holes 44, 44a positioned adjacent the periphery of the base plate. The other base plate 18 is provided with first and second sets of circumferentially spaced and alternating threaded bores 46, 46a positioned adjacent the periphery of that base plate, the bores 46, 46a being alignable with the holes 44, 44a respectively. Threaded screws 34, 34a are provided for threaded engagement with the threaded bores 46, 46a respectively and for a close fit within the holes 44, 44a respectively. The screws 34 should have at least 56 threads per inch and the screws 34a should have at least 80 threads per inch. A greater number of threads per inch provides higher resolution in the adjustment step. Finally, a resilient washer member 32 is provided, the washer member having through holes 48, 48a alignable with the bores 46, 46a and the holes 44, 44a respectively and also having a central void area 50, the configuration of which is not critical to the invention.

The components of FIG. 2 are assembled together as shown in FIG. 1, with the fibre assemblies 12, 14 connected to the base plates 16, 18 and with the base plates 16, 18 connected together with the obverse faces thereof in confronting relation and with the resilient washer member 32 sandwiched between the obverse base plate faces. The screws 34 pass through aligned holes 44 and 48 and are threadedly received in threaded bores 46 such that when the screws are tightened they sealingly clamp the washer member 32 between the base plates 16, 18. The screws 34a pass through aligned holes 44a and 48a and are threadedly received in threaded bores 46a. Initially they are loosely attached to the base plates so as not to contribute to the clamping forces. When initially assembling the base plates and the washer member together it is advantageous to slide the base plates on to a centering rod which fits closely within the bores 38, to ensure that the axes of the base plates are initially aligned when the screws 34 are set at their initial positions.

The washer member 32 is shown in FIG. 2 as being continuous peripherally and as having flat surfaces which abut the confronting faces of the base plates. Such a member is particularly useful if it is desirable to hermetically seal the interior of the coupler, as in an underwater application. In such an application an O-ring (not shown) could be placed between the end face of the boss 20, 22 and the inner face of the nut 26. If hermetic sealing is not required the washer member 32 could be formed as an annular spring member, such as a Belleville washer, having appropriate holes through which the screws 34, 34a could pass. Instead of an annular spring, individual springs located at each screw 34, 34a could bias the base plates apart. Alternatively the annular spring member (or the washer member 32) could be located within the circumference defined by the screws so that it would then not be necessary to have the screws pass through the washer or spring member itself. Usually the washer member 32 would be formed from a rubber or soft plastic material, although it would be possible to use a soft metal (e.g. indium) if desired.

As an alternative to the washer member 32 described above it would be possible to hermetically seal the interior of the connector with a commercially available O-ring. One base plate could be provided with an annular groove in its confronting face, in which the O-ring is receivable, a portion of the O-ring projecting away from the face of the base plate. The other base plate need not have a mating groove as its face will be forced into sealing engagement as the screws 34 are drawn tight. In this embodiment the O-ring preferably lies within the circumference of the screws 34, 34a.

With reference now to FIG. 3, the internal structure of a typical fibre assembly 12 will be described, it being understood that FIG. 3 is drawn to a much larger scale than the components themselves.

The fibre assembly 12 is made up of several components, namely the clad core 12a which is typically a silica or a doped silica glass of extremely small diameter (e.g. 100 microns), the plastic coating 12b which surrounds the clad core, and the cable or sheath 12c which may be formed from a resilient flexible plastics material and serves to protect the clad core and the plastic coating. The outer diameter of the sheath will be in the order of 4 mm.

At the end of the fibre assembly the sheath is removed or stripped from the plastic coating over a short length of about 13 mm and an optional, yet desirable, inner crimp sleeve 52 is fitted over and crimped to the exposed coating 12b. An optional, yet desirable, outer crimp sleeve 54 is fitted over and crimped to the sheath 12c adjacent the inner end of the inner crimp sleeve 52. At the free end of the assembly a very short length of the clad core 12a is exposed.

The assembly 12 having the sleeves 52 and 54 crimped thereon is slid into a fibre ferrule 56. Ferrule 56 includes three distinct sections, namely an enlarged first section 58 having an axial bore 60 therein adapted to loosely receive the outer crimp sleeve 54, a reduced diameter second section 62 having a reduced diameter blind axial bore 64 therein adapted to receive the inner crimp sleeve 52, and an end section 66 having a small axial bore 68 therein adapted to securely receive the short length of clad core 12a from the fibre assembly 12. The end section 66 has a beveled edge 70. The ferrule 56 can be metallic, plastic or ceramic, depending on the application of the connector. If for example, the connector is to be used in a high temperature environment a ceramic ferrule would be desirable since it has a coefficient of thermal expansion very close to that of the glass used for the optical fibre. Also, if crimp sleeves are not used the fibre ferrule could be smaller than it would be if crimp sleeves are used.

After the portions of sheath and coating have been stripped from the fibre assembly 12, the inner and outer crimp sleeves 52, 54 are secured to the coating 12b and the sheath 12c in the locations as described above. The sleeves may be metallic or plastic as long as they serve to reinforce the fibre assembly at its end. After fitting the sleeves to the fibre assembly the fibre ferrule is slid onto the end of the fibre assembly so that the clad core section fits in the bore 68 and the sleeves 52, 54 fit in the stepped bores 64, 60 respectively. The ferrule may be secured to the fibre assembly 12 in any known manner, as by crimping or by potting with an epoxy resin. The fit between each sleeve 52, 54 and its bore 64, 60 is slightly loose to permit the potting material to extend therealong.

After the fibre ferrule 56 is securely attached to the fibre assembly a graded index lens 72 of enlarged diameter, such as a SELFOC lens, is soldered or glued within the end of the lens holder 24. If hermeticity is important the lens could be metallized so that it can be soldered to the lens holder and thus sealed thereto.

The ferrule/fibre assembly 56/12 is next assembled into the lens holder 24. The lens holder 24 is generally cylindrical and is of a length equal to that of the lens 72 and the second and end portions of the ferrule 56. The lens holder 24 has an axially extending bore 74 adapted to securely receive the lens 72 and the second and end portions of the ferrule. The lens holder 24 also has an enlarged diameter portion 76 adjacent its inboard end defining annular shoulders 78 and 80. Furthermore, the barrel of the lens holder has the longitudinally extending key 42 formed thereon, the actual shape of the key 42 being immaterial as long as it mates with the keyway 40.

Before the ferrule 56 is assembled to the lens holder 24, the nut 26 is slid onto the inboard end of the lens holder. The nut 26 includes internal threads 82, an end face 84 and flats 86 for engagement by a suitable wrench if necessary. With the nut in place the ferrule assembly is slid into the bore 74 until the end face of the ferrule, containing the end face of the clad core abuts the end face of the lens 72. The lens holder is then secured to the ferrule in any conventional manner as by gluing or potting. An air hole 88 is provided in the wall of the lens holder at the interface between the lens 72 and the fibre ferrule 56. It permits the escape of air and/or excess glue or potting compound when the ferrule is assembled to the lens holder. Also, since the first section of the ferrule has a slightly greater diameter than that of the adjacent portion of the lens holder the nut 26 will be free to rotate on the lens holder but will be captured between the shoulder 80 on the lens holder and the first section of the ferrule.

When the two fibre assemblies 12, 14 have been constructed as described above, they may then be assembled to the base plates 16, 18 as previously described. The key 42 will engage the keyway 40 and, upon full insertion into the axial bore 38, the shoulder 78 on the lens holder 24 will abut against the outer face of the boss 20, 22 on the base plates 16, 18. Thus, by the mechanism of abutting faces and mating keys/keyways the fibre assemblies will always assume the same predetermined position in their respective base plates each time they are connected thereto.

When the connector of the present invention is first assembled there will be no guarantee that (a) the axis of the fibre core 12a, 14a is perfectly aligned with that of its GRIN lens 72, or (b) that the axes of opposing GRIN lenses 72, 72 in the joint are perfectly aligned. Expressed in a different way, there is no guarantee that the image transmitted from one fibre will not be offset excessively with respect to the receiving fibre. Any misalignment will result in losses at the joint. The present invention obviates that shortcoming by permitting adjustment of the relative angle between the two GRIN lenses and their fibres to achieve the desired optical energy transmission. Once adjustment has been accomplished the adjusted condition will be maintained even though the fibre assemblies may be disconnected from and reconnected to the joint connector 10, due to the precision positioning of the assemblies as detailed above. Should the original adjustment be lost or the optical energy transmitted deteriorate for any reason the joint can be readjusted to again optimize the energy transmission.

The initial adjustment of the joint requires a completely assembled joint, a test source of light and a meter-like receiver. The process is very simple and short in duration: an optical signal from the test source is beamed along one of the fibre assemblies, through the joint, to the other fibre assembly, and is received at the receiver. The receiver will provide a relative indication of the signal strength. The screws 34 are then rotated so as to coarsely move, or "tilt" one of the base plates relative to the other while the received signal is monitored. The screws have fine threads and their movements can be accurately controlled. The operator will quickly ascertain which screws require adjustment and he will then quickly adjust the appropriate screws to approximately obtain the desired strength of optical signal passing through the joint. The operator then repeats the foregoing procedure using only the very fine screws 34a, the movement of which can be very accurately controlled. By fine tuning the adjustment with screws 34a the operator can quickly achieve the optimum, or desired, signal strength passing through the joint. Thereafter, if necessary the coarse screws 34 can be seated against the base plate 16.

Once the desired signal strength has been obtained, thereby indicating that the image of the transmitting fibre is falling on the receiving fibre as desired, the adjustment procedure is terminated. The combination of a very fine pitch on the screws 34a and the resilient bias provided by the member 32 is sufficient to hold the screws 34, 34a in their adjusted condition so as to prevent any unwanted rotation thereof. Should readjustment of the joint be required later it would be merely necessary to repeat the adjustment procedure outlined above.

If further adjustment is not contemplated or if the coupler is to be used in a hostile environment the screws 34, 34a could be secured relative to the base plates as by gluing, thereby rendering them immobile. Alternatively it would be possible to glue, pot or solder the joint between the base plates after the adjustment step to render the joint immobile, albeit not readjustable.

The two-step adjustment procedure outlined above is equally usable with other embodiments of the inventions as described in the aforementioned U.S. application No. 847,416, (U.S. Pat. No. 4,753,510) whether one be dealing with fibre to fibre coupling or source to fibre coupling.

Figure 4:
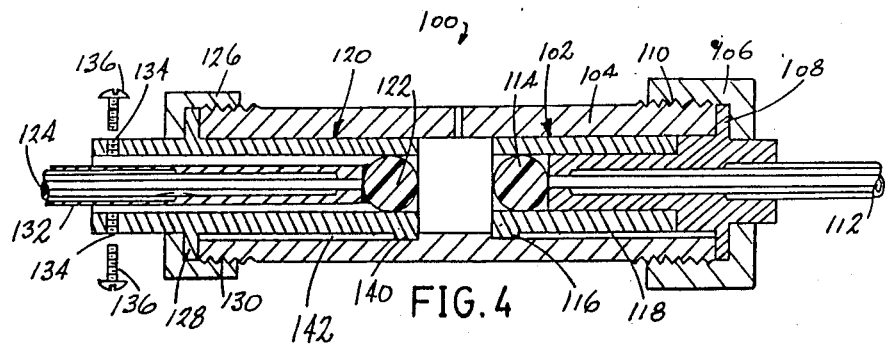
FIG. 4 shows an embodiment of the invention, in cross-section, utilizing radial adjustment techniques and a spherical lens instead of a cylindrical lens.

FIG. 4 shows a radial connector 100 in which a first ferrule or lens holder 102 is located in one end of a housing 104 and is secured therein by way of a nut 106 engaging the flange 108 of the ferrule and the threads 110 of the housing. The fibre assembly 112 terminates at and is adhered to the spherical beam expanding or imaging lens 114. The ferrule 102 should have a key 116 for engagement with a keyway 118 in the housing to achieve repeatable and positive location within the housing.

A second ferrule 120 carrying a spherical lens 122 and a fibre assembly 124 is positioned within the housing 104 from the other end thereof. In this instance a threaded nut 126 engages a flange 128 on ferrule 120 and the threads 130 on the housing to hold the ferrule 120 in the housing. The ferrule 120 may have a key (140) for engagement with a keyway (142) in the housing 104.

A fibre holder 132 carries the fibre assembly 124 and terminates at the spherical lens 122 which is affixed, as by gluing, to the fibre holder 132, and is welded to the central optical fibre. Threaded bores 134 pass through the ferrule 120 and receive threaded screws 136. The screws 136 center the fibre holder 132 and also serve to radially adjust the relative angle of the holder with respect to the ferrule 120 and the housing 104, it being noted that both the fiber assembly 124 and the spherical lens 122 will tilt together as the screws 136 are adjusted. Thus in this embodiment the optimal signal can pass from one fibre assembly to the other.

With this embodiment, as with all embodiments using axial or radial tilt adjustment principles it is recommended, but not essential, that the adjustments be carried out on the fibre and lens assembly which receives the optical signal from the transmitter side of the coupler. When the assembly is initially prepared it is likely that the transmitted optical signal will be very close to being aligned with the optical axis of the coupler. Adjustment of the transmitter side could destroy the initial alignment and make it more difficult to achieve the optimum signal strength. This problem is avoided or at least dramatically reduced if the receiver assembly alone is adjusted.

Needless to say, one could provide circumferentially altering "coarse" and "fine" threaded bores 134 about the ferrule 120 so as to utilize the principles of coarse and fine adjustment discussed hereinabove with respect to FIGS. 1 and 2. When doing so, one would first of all perform the coarse adjustment, then bring the fine screws into contact with the fibre holder 132, back off the coarse screws slightly, and proceed with the fine adjustment.

Figure 5:
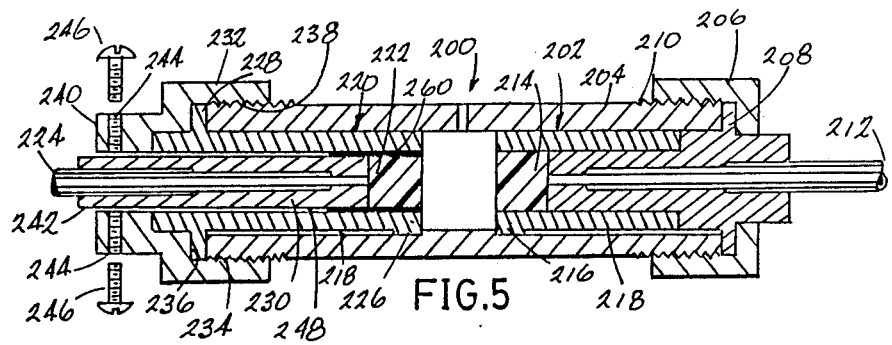
FIG. 5 shows another embodiment of the invention wherein a temporary jig is used to achieve adjustment.

FIG. 5 shows an alternative to the embodiment of FIG. 4 wherein a reusable adjustment mechanism is provided to replace the permanent adjustment mechanism shown in FIG. 4. With the embodiment of FIG. 5 it would not be possible to readjust the tilt angle of the fibre assembly relative to the ferrule should that component be removed from the housing for any reason.

In FIG. 5 a radial connector 200, similar to connector 100, is shown with a first ferrule or lens holder 202 located in one end of housing 204 and secured therein by way of a nut 206 engaging the flange 208 of the ferrule and the threads 210 of the housing. The fibre assembly 212 terminates at the beam expanding or imaging lens 214. The ferrule 202 has a key 216 for engagement with a keyway 218 which extends the length of housing 204.

A second ferrule 220 carrying cylindrical lens 222 and a fibre assembly 224 is positioned within the housing 204 from the other end thereof. A key 226 on the ferrule 222 engages keyway 218 and radial flange 228 engages the end face of the housing, so as to positively locate the ferrule within the housing.

Ferrule 220 has essentially a zero clearance fit within the housing 204 to also aid in positive location. The cylindrical lens 222 is affixed, as by gluing, to the inner end of a fibre holder 230 and the optical fibre within the fibre assembly 224 is also welded to the lens 222. The fibre holder 230 carries the fibre assembly 224 and has a relatively loose fit within the ferrule 220 although a short length of resilient tubing 260 surrounds the lens 222 and the inter end of the fibre holder 230 so as to resiliently center the lens 222 within the ferrule 220.

With the embodiment of FIG. 5 tilt adjustment of the fibre assembly 224 is achieved by using a specially designed jig in the form of adjusting nut 232, which nut, by way of threads 234 and shoulder 236 engages the threads 238 of housing 204 and the radial flange 228 to securely hold the ferrule 220 within the housing. An axial extension 240 of the nut 232 is radially spaced from an extension 242 of the fibre holder 230 and carries circumferentially spaced threaded bores 244, each adapted to receive an adjusting screw 246. As with the previously described embodiments the bores 244 and screws 246 could be of alternating coarse and fine threads for initial coarse and subsequent fine adjustments.

In order to use the embodiment of FIG. 5, after assembly of the right-hand fibre assembly, one inserts the ferrule 220 into the holder 204 and attaches the nut 232 to hold the ferrule in place. Screws 246 are threaded into the bores 244 until they project therethrough and engage the outer surface of the fibre holder extension 242. The screws 246, preferably of the coarse and fine variety, are adjusted as before until the optimum signal strength from transmitter (source) to receiver is achieved. Then one fills the circumferential gap 248 between the fibre holder 230 and the ferrule 220 with settable glue or a potting material to irrevocably fix the fibre assembly relative to the ferrule 220.

After the glue or potting material has set the screws 246 are backed off and the nut 232 is removed from the housing 204. It is replaced with a new nut essentially identical to the nut 126 of FIG. 4 to hold the ferrule 220 within the housing on a permanent basis.

Although the ferrule 220 can be removed from and reinserted within the housing 204 it is no longer possible to readjust the tilt angle between the fibre assembly 224 and the ferrule 220. This embodiment could be used in situations where a large volume of identical couplers is to be used and it is not necessary to provide for adjustment after final assembly.

As with the embodiment of FIG. 4, spherical lenses could be used in place of the cylindrical lenses 214, 222 without affecting the principles of adjustment.

Figure 6:
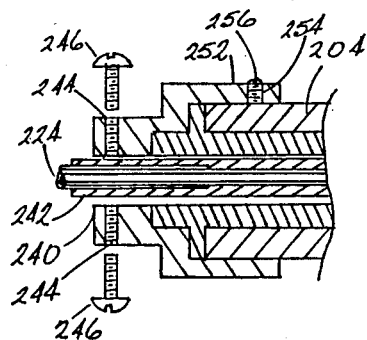
FIG. 6 shows a further development of the invention as depicted in FIG. 5.

Also, as seen in FIG. 6, the adjustment member 252 could have a smooth sliding fit with the housing 204 instead of the mating threads 234, 238 of FIG. 5. A radial threaded bore 254 could receive a set screw 256 to hold the member 252 in place while the tilt adjustments are effected. Once the potting material has set the screw 256 is backed off and the member 252 is slid from the housing 204

Figure 7:
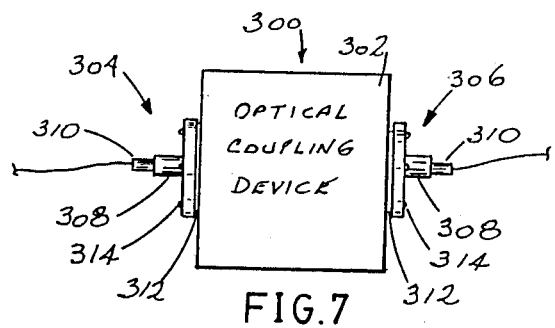
FIGS. 7 and 8 show schematically the use of tilt adjustable connectors used on the transmitter and receiver sides of optical coupling devices through which light energy is transmissible.
Figure 8:
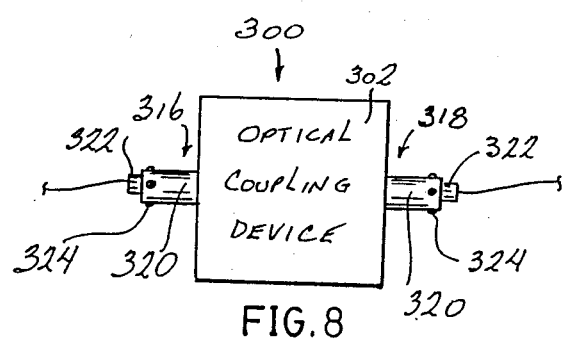

Turning now to FIGS. 7 and 8 additional uses of connectors of the present invention including those of parent application No. 06/847,416 (U.S. Pat. No. 4,753,510) are illustrated. The connectors are not shown in detail since any of the specific configurations already disclosed could be used In each of FIGS. 7 and 8 reference number 300 is used to represent an optical coupling device, self-contained within an appropriate housing. The device could be a beam splitter, as described in application No. 06/847,416, (U.S. Pat. No. 4,753,510) or it could be any other device or optical instrument such as a mirror, isolator, or polarizer for example, which can transmit light energy.

The device 300 includes a housing 302 and in FIG. 7, axially tilt-adjustable connectors 304, 306 are attached to the housing 302 on the input and output sides respectively. Each connector 304, 306 includes a base plate 308 and a fibre ferrule assembly 310 similar to the components discussed with respect to FIG. 1. A resilient member 312 is positioned between each base plate and the housing and securing and adjusting means in the form of circumferentially spaced screws 314 are provided to secure the base plate to the housing and to adjust the orientation of the base plate vis à vis the housing and the opposing base plate.

In FIG. 8, radially tilt-adjustable connectors 316, 318 are attached to the housing 302 on the input and output sides respectively. Each connector 316, 318 includes a generally cylindrical housing 320 and a fibre ferrule assembly 322 similar to the components discussed with respect to FIGS. 4 to 6. A resilient member is positioned between the outer surface of the ferrule assembly 322 and the inner surface of the housing 320 and a plurality of radially directed securing and adjusting means such as screws 324 extend through the housing to bear against the ferrule assembly for adjustment as previously described.

When operating with the embodiment of FIG. 7 or 8, one first of all adjusts the connector on the transmitter (input) side of the housing 302 so as to laterally orient the collimated beam leaving the connector with respect to the lens axis of the receiving (output) connector until the collimated beam axis from the transmitter side coincides with the receiver lens axis. This reduces losses due to lateral misalignment of the lenses. By adjusting at the transmitter side it becomes easier to align the lenses laterally when there is a large separation between the lenses. Once the collimated beam axis and the receiver lens axis coincide the transmitter side is fixed permanently by gluing, or temporarily by using set screws to maintain the tilt angle. Then, one adjusts the receiver side using the appropriate technique to achieve optimum coupling efficiency.

While certain aspects of the invention have been described herein the invention should not be limited to what has been illustrated as there are undoubtedly many applications for the invention which can occur to a skilled workman without departing from the principles as described. The protection to be afforded this invention is to be determined from the scope of the claims appended hereto.

The embodiments of the invention in which an exclusive property of privilege is claimed are defined as follows:

1. A coupling device for optically coupling a pair of optical fibres in end-to-end relation, each of said fibres terminating at a beam expanding or imaging lens, comprising base means for each of said fibres, each such base means including an axial bore and means for securing one of said lenses therein; a resilient member positionable between confronting end faces of said base means, said resilient member permitting passage of light energy thereacross; and axially extending first and second securing and adjusting means interconnecting said base means with said resilient member trapped therebetween; whereby said first securing and adjusting means are individually axially displaceable to effect a coarse angular adjustment of one base means relative to the other, and the second securing and adjusting means are individually axially displaceable to effect a fine angular adjustment of said one base means relative to the other so as to optimize the light energy transmissible from one fibre and its lens to the other lens and its fibre.

2. The coupling device of claim 1 wherein said first and second securing and adjusting means includes a plurality of alternating first and second threaded screws circumferentially spaced apart adjacent the outer periphery of said base means, each screw passing through a through bore in one base means and being receivable in a mating threaded bore in the other base means, each of said first screws having a coarser thread than each of said second screws.

3. A method of optimizing the light energy transmissible from a source of light energy to an optical fibre within a coupling device holding said fibre generally in position for energy transmission from said source to said fibre, said coupling device including first and second base means connectable to said source and said fibre respectively, beam expanding or imaging lens means in at least said second base means in association with said fibre, a resilient member, and first and second securing and adjusting means interconnecting said base means together with said resilient member trapped between confronting faces thereof, comprising the steps of: transmitting a test optical signal from said source; monitoring said fibre to determine the strength of the test signal received thereby; adjusting said first securing and adjusting means to coarsely alter the relative angular position of said base means until the received signal is close to its desired strength, and adjusting said second securing and adjusting means to finely alter the relative angular position of said base means until the received signal is at its desired strength, thereby indicating that no further adjustment is required.

4. A coupling device for optically coupling a pair of optical fibres in end-to-end relation, each of said fibres terminating at a beam expanding or imaging lens, at least one of said lenses being spherical, comprising: elongated cylindrical housing means; first ferrule means mounting one of said fibres and an associated lens and having means engageable with said housing means to secure said first ferrule means within said housing means at a predetermined position therein; second ferrule means containing said spherical lens therein and carrying a fibre holder surrounding the other of said fibres, said second ferrule means being positionable within said housing means with the spherical lens thereof adjacent the lens of said first ferrule means; and radially extending securing and adjusting means extending through said second ferrule means for engagement with said fibre holder away from said spherical lens; whereby said securing and adjusting means are individually displaceable to effect angular adjustment of said fibre holder relative to said housing means and said first ferrule means so as to optimize the light energy transmissible from one fibre and its lens to the other lens and its fibre.

5. The device of claim 4 wherein said second ferrule means includes a plurality of circumferentially spaced apart threaded bores therethrough and each of said securing and adjusting means is a threaded screw receivable in a corresponding one of said bores for bearing engagement with said fibre holder.

6. The device of claim 5 wherein said housing means has an externally threaded portion at each end and each of said ferrule means carries a nut for threaded engagement with a corresponding one of the threaded portions on the housing means.

7. The device of claim 4 wherein said second ferrule means includes a plurality of alternating circumferentially spaced apart first and second threaded bores therethrough and said securing and adjusting means includes a plurality of first and second screws receivable in said first and second bores respectively for bearing engagement with said fibre holder, said first bores and screws being coarser than said second bores and screws.

8. A method of optimizing the light energy transmissible to an optical fibre within a coupling device holding said fibre generally in position for energy transmission thereto, said coupling device including cylindrical housing means, ferrule means mounting a beam expanding or imaging lens within said housing means and carrying a fibre holding means surrounding said fibre, and radially extending first and second securing and adjusting means extending through said ferrule means for engagement with said fibre holding means, comprising the steps of transmitting a test optical signal for reception by said optical fibre; monitoring said fibre to determine the strength of the transmitted energy received thereby; adjusting said first securing and adjusting means to coarsely alter the angular position of said fibre holding means relative to said ferrule means until the received energy is close to the desired strength; adjusting said second securing and adjusting means into engagement with said fibre holding means; backing off said first securing and adjusting means slightly; and adjusting said second securing and adjusting means to finely alter the angular position of said fibre holding means relative to said ferrule means until the received energy is at the desired strength, thereby indicating that no further adjustment is necessary.

9. A method of optimizing the light energy transmissible to an optical fibre within a coupling device holding said fibre generally in position for energy transmission thereto, said coupling device including cylindrical housing means, ferrule means mounting a beam expanding or imaging lens within said housing means and carrying a fibre holding means surrounding said fibre, comprising the steps of: positoning a jig on said housing means such that an axial extension of said jig is radially spaced from a cylindrical extension of said fibre holding means; directing radially extending adjusting means through said jig extension for engagement with said fibre holding means extension; transmitting a test signal for reception by said optical fibre; monitoring said fibre to determine the strength of the transmitted energy received thereby; adjusting said adjusting means to alter the angular position of said fibre holding means relative to said housing means until the received energy is at the desired strength, thereby indicating that no further adjustment is necessary; fixing said fibre holding means in its adjusted position relative to said housing means; releasing said adjusting means; and replacing said jig with a ferrule retaining means.

10. The method of claim 9 wherein said fixing step includes introducing a settable bonding material between said fibre holding means and said ferrule means and allowing said material to set.

11. A coupling device for optically coupling a pair of optical fibres in end-to-end relation, each of said fibres terminating at a beam expanding or imaging lens, comprising: elongated cylindrical housing means; first and second ferrule means each carrying one of said fibres and an associated lens and having means engageable with said housing means to secure the respective ferrule means within said housing means at a predetermined position therein with the lens of said first ferrule means being adjacent the lens of said second ferrule means; at least one of said ferrule means carrying a fibre holder mounting the fibre associated therewith and connected to the lens associated therewith; a cylindrical resilient member surrounding a portion of said fibre holder and the lens associated therewith; and radially extending securing and adjusting means extending through said one ferrule means for engagement with said fibre holder away from the lens associated therewith; whereby said securing and adjusting means are individually displaceable to effect angular adjustment of said fibre holder relative to said housing means and the other ferrule means so as to optimize the light energy transmissible from one fibre and its lens to the other lens and its fibre.

12. A system for transmitting light energy from one optical fibre to a second optical fibre through an optical coupling device comprising: a housing containing said device and having light energy inlet and outlet means; a first optical coupler connected to said housing at said inlet means; a second optical coupler connected to said housing at said outlet means; first ferrule means receivable in said first optical coupler and containing a transmitter optical fibre and a beam expanding or imaging lens; second ferrule means receivable in said second optical coupler and containing a receiver optical fibre and beam expanding or imaging lens; and adjustment means for tiltably adjusting each of said first and second ferrule means relative to said housing so as to optimize the light energy transmissible from said transmitter fibre and lens through said optical coupling device to said receiver fibre and lens.

13. The system of claim 12 wherein each of said optical couplers comprises: a generally circular base plate having a boss extending therefrom and an axial bore therethrough for receiving the associated ferrule means therein; a resilient member positioned between opposing faces of said base plate and said housing; and a plurality of fine-pitch screws extending through said base plate and said resilient member and threadedly engageable with said housing, said screws being evenly circumferentially spaced about the circumference of said base plate; whereby said screws may be adjusted to alter the orientation of the axis of said base plate relative to said housing to thereby adjust the position of the optical axis of the lens contained in said base plate relative to said housing.

14. The system of claim 12 wherein each of said couplers includes: a cylindrical housing extending outwardly from said coupler housing and having a bore therethrough for receiving the associated ferrule means therein; a resilient member positionable between the ferrule means and the cylindrical housing adjacent said coupler housing; and a plurality of fine-pitch screws extending radially through the cylindrical housing at the end thereof away from said coupler housing, said screws being evenly circumferentially spaced around the cylindrical housing and passing therethrough to bear against the ferrule means; whereby said screws may be adjusted to alter the orientation of the lens optical axis relative to said coupler housing.

* * * * *